(12) United States Patent
Jho et al.

(10) Patent No.: US 11,791,997 B2
(45) Date of Patent: Oct. 17, 2023

(54) METHOD AND APPARATUS FOR GENERATING SECRET KEY BASED ON NEURAL NETWORK SYNCHRONIZATION

(71) Applicant: Electronics and Telecommunications Research Institute, Daejeon (KR)

(72) Inventors: Nam-Su Jho, Daejeon (KR); Juyoung Kim, Daejeon (KR); Taek-Young Youn, Daejeon (KR); Ku Young Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 225 days.

(21) Appl. No.: 17/239,237

(22) Filed: Apr. 23, 2021

(65) Prior Publication Data

US 2021/0336779 A1    Oct. 28, 2021

(30) Foreign Application Priority Data

Apr. 23, 2020   (KR) .......................... 10-2020-0049508

(51) Int. Cl.
*H04L 9/08* (2006.01)
*G06N 3/04* (2023.01)

(52) U.S. Cl.
CPC ............. *H04L 9/0869* (2013.01); *G06N 3/04* (2013.01)

(58) Field of Classification Search
CPC ....... H04L 9/0869; H04L 9/0877; H04L 9/12; H04L 9/0872; H04L 9/0838;

(Continued)

(56) References Cited

U.S. PATENT DOCUMENTS 9,648,026 B2    5/2017  Pelletier
11,210,586 B1 *  12/2021  Duong ..................... G06N 3/04
(Continued)

FOREIGN PATENT DOCUMENTS

KR    1020150142623 A    12/2015

OTHER PUBLICATIONS

Godhavari, T. et al. (IEEE Indicon 2005 Conference, Chennai, India, Dec. 11-13, 2005)—Cryptography using Neural Networks (Year: 2005).*

(Continued)

*Primary Examiner* — Quazi Farooqui
(74) *Attorney, Agent, or Firm* — William Park & Associates Ltd.

(57) ABSTRACT

A method and an apparatus for generating a secret key for encrypted communication using a synchronized neural network, which includes: generating initial codewords based on a bit string of weight values of the synchronized neural network and transmitting a first partial codeword of the initial codewords to a device of another party; receiving a second partial codeword generated by the device of the other party and combining final codewords based on the second partial codeword received from the device of the party and the bit string of the weight values; performing an error correction on the combined final codewords and transmitting first restoration success information according to the error correction to the device of the other party; and receiving second restoration success information from the device of the other party and generating the secret key based on the restoration success information of the device of the other party, are provided.

17 Claims, 4 Drawing Sheets

(58) Field of Classification Search
CPC ....... H04L 9/0618; H04L 9/085; H04L 9/088; H04L 2209/34; H04L 9/08; G06N 3/04; G06N 3/045; G06N 3/08
See application file for complete search history.

(56) References Cited

U.S. PATENT DOCUMENTS

| | | | |
|---|---|---|---|
| 2010/0138668 A1* | 6/2010 | Tsuria | G06V 40/18 340/5.83 |
| 2014/0189357 A1 | 7/2014 | Park et al. | |
| 2018/0018663 A1* | 1/2018 | Van | G07F 7/0873 |
| 2018/0123797 A1 | 5/2018 | Noh et al. | |
| 2019/0349426 A1* | 11/2019 | Smith | H04L 61/5069 |
| 2021/0250812 A1* | 8/2021 | Caswell | H04L 45/44 |

OTHER PUBLICATIONS

Ahmed M. Allam et al., On the Improvement of Neural Cryptography Using Erroneous Transmitted Information with Error Prediction, IEEE Transactions on Neural Networks, vol. 21, No. 12, Dec. 2010, pp. 1915-1924.

Ido Kanter et al., Secure exchange of information by synchronization of neural networks, Europhys. Lett. 57, Feb. 7, 2002.

Xinyu Lei et al., Two-layer tree-connected feed-forward neural network model for neural cryptography, Physical Review E 87, 032811, 2013, American Physical Society.

* cited by examiner

METHOD AND APPARATUS FOR GENERATING SECRET KEY BASED ON NEURAL NETWORK SYNCHRONIZATION

CROSS-REFERENCE TO RELATED APPLICATION

This application claims priority to and the benefit of Korean Patent Application No. 10-2020-0049508 filed in the Korean Intellectual Property Office on Apr. 23, 2020, the entire contents of which are incorporated herein by reference.

BACKGROUND OF THE INVENTION

(a) Field of the Invention

This description relates to a method and an apparatus for generating a secret key using a synchronized neural network.

(b) Description of the Related Art

Modern encryption algorithms use a method based on the security of mathematical difficulties such as the RSA problem or the Diffie-Hellman problem as a key exchange technology. However, with the development of quantum computers, it is expected that the mathematical difficulties that ensure the security of the modern encryption systems will be solved, so that it is no longer possible to rely on the security of certain mathematical difficulties. A key exchange technology based on neural network synchronization is attracting attention as a new encryption technology that is free from the threat of quantum computers.

The above information disclosed in this Background section is only for enhancement of understanding of the background of the description, and therefore it may contain information that does not form the prior art that is already known in this country to a person of ordinary skill in the art.

SUMMARY OF THE INVENTION

The present description has been made in an effort to provide a method and an apparatus for generating a secret key based on neural network synchronization.

An embodiment provides a method for generating a secret key for encrypted communication using a synchronized neural network.

Another embodiment provides an apparatus for generating a secret key for encrypted communication using a synchronized neural network.

Yet another embodiment provides an apparatus for generating a secret key for encrypted communication using a synchronized neural network.

According to an embodiment, a method for generating a secret key for encrypted communication using a synchronized neural network is provided. The method includes: generating initial codewords based on a bit string of weight values of the synchronized neural network and transmitting a first partial codeword of the initial codewords to a device of another party; receiving second partial codewords generated by the device of the other party and combining final codewords based on the second partial codeword received from the device of the other party and the bit string of the weight values; performing an error correction on the combined final codewords and transmitting first restoration success information according to the error correction to the device of the other party; and receiving second restoration success information from the device of the other party and generating the secret key based on the second restoration success information.

The generating initial codewords based on a bit string of weight values of the synchronized neural network and transmitting a first partial codeword of the initial codewords to a device of another party may include: dividing the bit string into a plurality of blocks; and generating the initial codewords for a part of the plurality of blocks, wherein each of the plurality of blocks has a k-bit length.

When a length of each of the initial codewords is n, a length of the first partial codeword may be (n–k)-bit.

The generating the initial codewords for a part of the plurality of blocks may include: generating the initial codewords for a half of the plurality of blocks, and the combining final codewords based on the second partial codeword received from the device of the other party and the bit string of the weight values may include: combining the final codewords based on another half of the bit string corresponding to another half of the plurality of blocks and the second partial codeword of second codewords generated by the device of the other party based on a bit string of weight values updated by the other party.

The receiving a second partial codeword generated by the device of the other party and combining final codewords based on the second partial codeword received from the device of the other party and the bit string of the weight values may include: receiving M/(2k) second partial codewords of (n–k)-bit length from the device of the other party when a length of the weight values is M-bit and the M is a multiple of 2.

The receiving a second partial codeword generated by the device of the other party and combining final codewords based on the second partial codeword received from the device of the other party and the bit string of the weight values may further include: determining one of the final codewords by combining the second partial codeword of the (n–k)-bit length and one block corresponding to the weight values of k-bit length.

The receiving second restoration success information from the device of the other party and generating the secret key based on the second restoration success information may include: determining a block for which restoration has failed among the plurality of blocks based on the second restoration success information; and restoring bit information from remaining blocks except for the block for which the restoration has failed among the plurality of blocks.

The receiving second restoration success information from the device of the other party and generating the secret key based on the restoration success information may further include: generating a seed based on the restored bit information and generating the secret key by inputting the seed to a hash function.

According to another embodiment, an apparatus for generating a secret key for encrypted communication using a synchronized neural network is provided. The apparatus includes: a processor, a memory, and a communication device, wherein the processor coupled to the communication device executes a program stored in the memory to perform: generating initial codewords based on a bit string of weight values of the synchronized neural network and transmitting a first partial codeword of the initial codewords to a device of another party through the communication device; receiving a second partial codeword generated by the device of the other party through the communication device and combining final codewords based on the second partial codeword received from the device of the other party and a remaining bit string of the weight values which is not used to generate the initial codewords; performing an error correction on the combined final codewords and transmitting first restoration success information according to the error correction to the device of the other party through the communication device; and receiving second restoration success information from the device of the other party through the communication device and generating the secret key based on the restoration success information of the device of the other party.

When generating the initial codewords based on the bit string of the weight values of the synchronized neural network and transmitting the first partial codeword of the initial codewords to the device of the other party through the communication device, the processor may perform: dividing the bit string into a plurality of blocks; and generating the initial codewords for a part of the plurality of blocks, wherein each of the plurality of blocks has a k-bit length.

When a length of each of the initial codewords is n, a length of the first partial codeword may be (n−k)-bit.

When generating the initial codewords for the part of the plurality of blocks, the processor may perform generating the initial codewords for a half of the plurality of blocks, and when combining final codewords based on the second partial codeword received from the device of the other party and the bit string of the weight values, the processor may perform combining the final codewords based on another half of the bit string corresponding to another half of the plurality of blocks and the second partial codeword of second codewords generated by the device of the other party based on a bit string of weight values updated by the other party.

When receiving the second partial codeword generated by the device of the other party through the communication device and combining the final codewords based on the second partial codeword received from the device of the other party and the remaining bit string of the weight values which is not used to generate the initial codewords, the processor may perform receiving M/(2k) second partial codewords of (n−k)-bit length from the device of the other party through the communication device when a length of the weight values is M-bit and the M is a multiple of 2.

When receiving the second partial codeword generated by the device of the other party through the communication device and combining the final codewords based on the second partial codeword received from the device of the other party and the remaining bit string of the weight values which is not used to generate the initial codewords, the processor may execute the program to further perform determining one of the final codewords by combining the second partial codeword of the (n−k)-bit length and one block corresponding to the weight values of k-bit length.

When receiving the second restoration success information from the device of the other party through the communication device and generating the secret key based on the restoration success information of the device of the other party, the processor may performs determining a block for which restoration has failed among the plurality of blocks based on the second restoration success information; and restoring bit information from remaining blocks except for the block for which the restoration has failed among the plurality of blocks.

When receiving the second restoration success information from the device of the other party through the communication device and generating the secret key based on the restoration success information of the device of the other party, the processor may execute the program to further perform generating a seed based on the restored bit information and generating the secret key by inputting the seed to a hash function.

According to yet another embodiment, an apparatus for generating a secret key for encrypted communication using a synchronized neural network is provided. The apparatus includes: a processor, a memory, and a communication device, wherein the processor executes a program stored in the memory to perform: generating initial codewords based on a bit string corresponding to weight values of the synchronized neural network; receiving restoration success information according to an error correction from a device of another party through the communication device after the error correction of final codewords combined by using a part of the initial codewords by the device of the other party is performed; and generating the secret key based on the restoration success information.

DETAILED DESCRIPTION OF THE EMBODIMENTS

Figure 1:
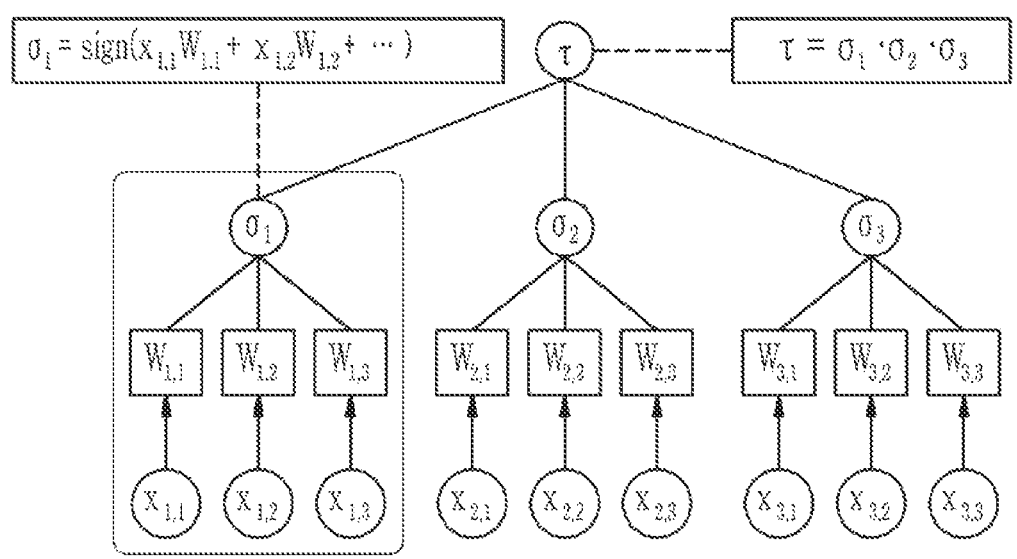
FIG. 1 is a schematic view illustrating a TPM of a key exchange method based on neural network synchronization according to an embodiment.

In the following detailed description, only certain embodiments of the present disclosure have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, a transmitting device and/or a receiving device may be called user equipment (UE), mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the transmitting device and/or the receiving device may be called the base station (BS), an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

Figure 2:
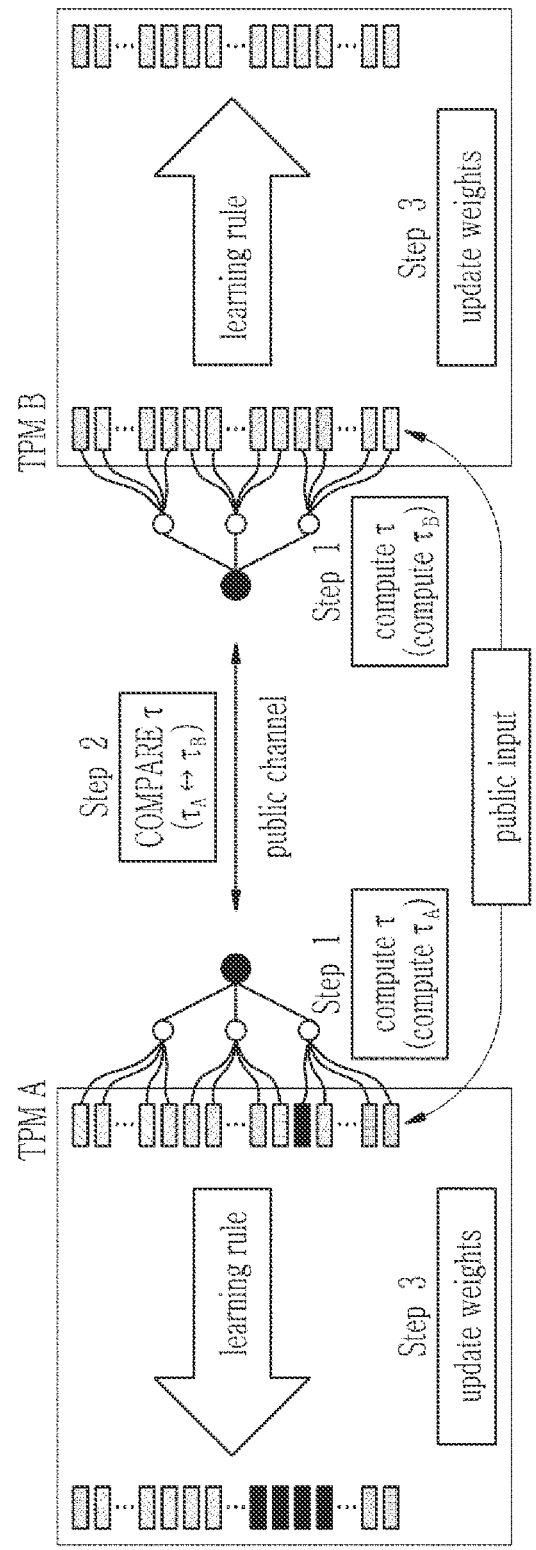
FIG. 2 is a schematic view illustrating a method of performing one round of the neural network synchronization process according to an embodiment.

FIG. 1 is a schematic diagram illustrating a TPM of a neural network for generating a secret key according to an embodiment, and FIG. 2 is a schematic diagram illustrating a method for performing one round of a neural network synchronization process according to an embodiment.

In the key exchange technology based on neural network synchronization, a transmitting end and a receiving end each may organize a neural network having the same structure, achieve synchronization of each of the neural networks through a mutual learning process, and generate the same secret key using the synchronized neural networks. For example, each of the neural networks at the transmitting end and the receiving end may include a two-layer perceptron structure having n (e.g., 3) intermediate units and a tree parity machine (TPM) having an output value of 1 bit. The transmitting end and the receiving end may set a random weight value in a leaf node of the TPM of each neural network and initialize the neural network. Here, the weight value set for each leaf node may be an arbitrary integer included within a range [−L, L] determined by an integer L shared in advance between the transmitting end and the receiving end. After the initialization, the transmitting end and the receiving end may achieve the synchronization between the two neural networks by repeating learning rounds. The same input value disclosed in each learning step may be transmitted to the transmitting end and the receiving end, and the transmitting end and the receiving end may determine a parity value of the TPM of the neural network based on the transmitted input value and the weight value. The transmitting end and the receiving end may transmit the parity value of their neural network to the other party, and the transmitting end and the receiving end may determine whether to update the weight value included in the TPM by comparing the parity value of their neural network with the parity value of the neural network of the other party. Here, the update method of the weight value may be called a learning rule. According to the learning rules used for the neural network synchronization, an efficiency and a stability of the neural network synchronization may be determined.

In the neural network synchronization-based secret key generation method according to an embodiment, devices at the transmitting end and the receiving end may generate and exchange a secret key through a neural network configuration step, a neural network synchronization step, and a secret key generation step. The secret key generation step may be a generation process of the secret key using the synchronized neural network. In the neural network synchronization-based secret key generation method according to the embodiment, the transmitting end and the receiving end may be equivalent.

In the neural network configuration stage, each of the transmitting end and the receiving end may configure their own neural network. In order to configure the TPM included in the neural network, the transmitting end and/or the receiving end may determine and share neural network configuration parameters. The neural network configuration parameters may include L for the range of the weight value, h for the number of the intermediate nodes, and n for the number of the leaf nodes connected to the intermediate nodes. For example, it may be L=40, h=3, and n=1000. The neural network configured based on the same neural network configuration parameter may be the same at the transmitting end and the receiving end. After configuring the TPM, the transmitting end and the receiving end may allocate a random weight value to the leaf node of their TPM. The range of the weight value may be −L≤weight value≥L. The weight value of the TPM may be known only to the transmitting end or the receiving end to which the weight value has been allocated.

In the synchronization step, the transmitting end and the receiving end may share a variable T for termination of the synchronization and a learning rule for the progress of the synchronization. The synchronization may be performed through repetition of a plurality of rounds, and an arbitrary disclosed input value may be determined for each round. The input value may be 1 bit of information determined for each leaf node of the TPM, and σ and τ may be determined through an operation between the input value and the determined weight value for the TPM.

Referring to FIG. 1, a value σ1 of a first leaf node may be determined by a result of a signum function for a sum of products of input $x_{1,1}, x_{1,2}, x_{1,3}$ and weight values $w_{1,1}, w_{1,2}, w_{1,3}$, as in equation 1.

$$\sigma_1 = \text{sign}(x_{1,1}W_{1,1} + x_{1,2}W_{1,2} + x_{1,3}W_{1,3}) \quad \text{(Equation 1)}$$

In FIG. 1, each input $x_i$ may be 1 bit. In addition, the value T of the intermediate node may be determined by a product of the values of each leaf node.

$$\tau = \sigma_1 \cdot \sigma_2 \cdot \sigma_3 \quad \text{(Equation 2)}$$

In FIG. 1, the number of leaf nodes connected to the intermediate node may be 3.

The transmitting end and the receiving end may transmit the computed τ value to the other party and may increase or decrease the weight value of each TPM according to the learning rule. For the learning rule, the following equations 3 to 5 may be referenced.

$$\text{Hebbian Learning Rule: } w_{i,j}^+ = g(w_{i,j} + x_{i,j}\tau\Theta(\sigma_i\tau)\Theta(\tau_A\tau_B)) \quad \text{(Equation 3)}$$

$$\text{Anti-Hebbian Learning Rule: } w_{i,j}^+ = g(w_{i,j} - x_{i,j}\tau\Theta(\sigma_i\tau)\Theta(\tau_A\tau_B)) \quad \text{(Equation 4)}$$

$$\text{Random-Walk Learning Rule: } w_{i,j}^+ = g(w_{i,j} + x_{i,j}\Theta(\sigma_i\tau)\Theta(\tau_A\tau_B)) \quad \text{(Equation 5)}$$

In equation 3 to 5, the Θ(x) function may be a function that outputs 1 when x is positive and 0 when x is negative. That is, when $\tau_A = \tau_B$, the weight value of the leaf node connected to the intermediate node satisfying $\sigma_i = \tau$ may be updated. During the synchronization, when $\tau_A = \tau_B$ occurs during consecutive T rounds, the synchronization is terminated, and the transmitting end and the receiving end may perform the secret key generation step based on the weight value stored in each TPM after the synchronization is terminated.

Figure 3:
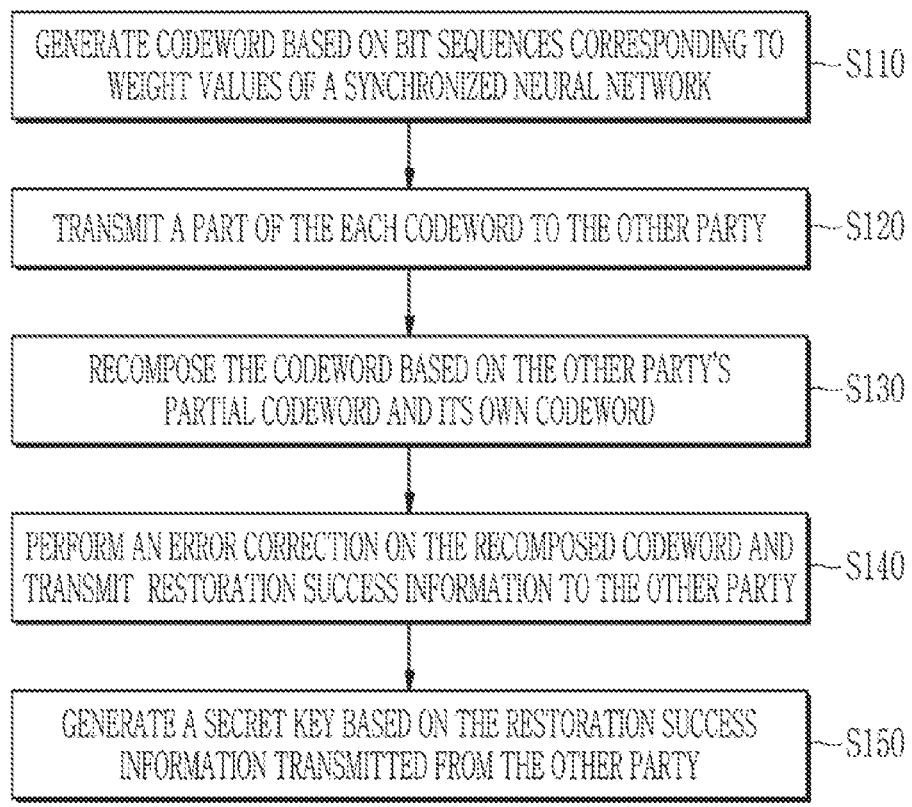
FIG. 3 is a flowchart illustrating a method of generating a secret key for encrypted communication using a synchronized neural network.

FIG. 3 is a flowchart illustrating a method for generating a secret key for encrypted communication using a synchronized neural network.

According to an embodiment, weight values of the synchronized neural networks of both ends may include an error of less than e %, where e is a predetermined variable. For example, when the weight value is 10 bits and 1,000 weight values are included in each neural network, at the end of the synchronization, an error occurs in less than 10,000×e/100 information among 10,000 bits of information that is the entire weight value.

In addition, each party of the encrypted communication (i.e., a transmitting apparatus of a transmitting end and a receiving apparatus of a receiving end) may determine and share an error correction code ECC (n, k, t) in advance. The ECC(n,k,t) may ensure that even if an error of t-bit occurs in the codeword of n-bit when the n-bit codeword is generated based on initial input information of k-bit, the initial input information of k-bit can be accurately restored. The transmitting apparatus and the receiving apparatus using the ECC(n,k,t) may determine restoration success information as 'restore failure' when an error exceeding t-bit occurs in the codeword.

Referring to FIG. 3, each party of the encrypted communication may generate the codeword based on bit sequences corresponding to the weight value of the synchronized neural network (S110). First, the transmitting apparatus and the receiving apparatus may divide a bit string (M-bit) of the weight value of the synchronized neural network into blocks. The length of each block is k-bit, and the number of blocks is 2b. When M is not a multiple of 2, the transmitting apparatus and the receiving apparatus may pad zeros in the bit string of the weight value, so that M is a multiple of 2 (i.e., 0 is successively added to the bit string). One of the transmitting apparatus or the receiving apparatus may generate n-bit codewords for each of the first b (or M/2) blocks (#1 to #b blocks) among 2b blocks, and the other apparatus may generate n-bit codewords for each of the latter b blocks (#b+1 to #2b blocks) among 2b blocks. Since the ECC(n,k,t) is used, the length of the codeword generated from the k-bit block is n-bit (i.e., the encoding rate of the block is k/n). For example, when the transmitting apparatus generates the codeword for the blocks of #1 to #b, the receiving apparatus may generate the codeword for the blocks of #b+1 to #2b. For example, the codeword generated by the transmitting apparatus and receiving apparatus may be as shown in Equation 6 below.

$$ECC(W_i) = W_i \| C_i (i=1, \ldots, b)$$

$$ECC(W_i') = W_i' \| C_i' (i=b+1, \ldots, 2b) \qquad \text{(Equation 6)}$$

The transmitting apparatus and the receiving apparatus may transmit a part of each of the b codewords to the other party (S120). The b codewords generated by the transmitting apparatus and the receiving apparatus are each n-bit, and the transmitting apparatus and the receiving apparatus may transmit the remaining (n–k)-bit partial codewords to the other party excluding the k-bit corresponding to the initial input information among the n-bit codewords. For example, the transmitting apparatus may transmit b×(n–k) bits of information corresponding to block #1 to #b to the receiving apparatus, and the receiving apparatus may transmit b×(n–k) bits of information corresponding to block #b+1 to block #2b to the transmitting apparatus.

The transmitting apparatus and the receiving apparatus may combine the codeword based on the other party's partial codeword and its own codeword (or its own weight values) (S130). For example, the transmitting apparatus may combine an n-bit codeword by combining the k-bit block of the weight value of the transmitting apparatus and the (n–k)-bit partial codeword transmitted from the receiving apparatus for the blocks #b+1 to #2b. In addition, for the blocks #1 to #b, the receiving apparatus may combine an n-bit codeword based on the block of k-bits of the weight value of the receiving apparatus and a partial codeword of (n–k) bits transmitted from the transmitting apparatus.

The transmitting apparatus and the receiving apparatus may perform an error correction on the combined codewords and transmit information on successful restoration of the initial input information to the other party (S140). For example, the transmitting apparatus may perform the error correction on the combined codeword of blocks #b+1 to #2b, and the receiving apparatus may perform the error correction on the combined codeword of blocks #1 to #b. In the transmitting apparatus and the receiving apparatus, the error correction may be performed as shown in Equation 7 below.

$$DEC(W_i \| C_i') = W_i' \text{ or Fail} (i=b+1, \ldots, 2b)$$

$$DEC(W_i' \| C_i') = W_i \text{ or Fail} (i=1, \ldots, b) \qquad \text{(Equation 7)}$$

For example, if the error correction is successful and the initial input information is restored, the restoration success information may be determined as 1, and if the error correction fails, the restoration success information may be determined as 0. Thereafter, the transmitting apparatus may transmit b-bit restoration success information corresponding to blocks #b+1 to #2b to the receiving apparatus, and the receiving apparatus may transmit b-bit restoration success information corresponding to blocks #1 to #b to the transmitting apparatus.

Finally, the transmitting apparatus and the receiving apparatus may generate the secret key based on the restoration success information transmitted from the other party (S150). The transmitting apparatus and the receiving apparatus may identify a block that is not restored and a block that can be restored based on the other party's restoration success information. For example, when b is 10 and the receiving apparatus transmits '1111011110' to the transmitting apparatus as the restoration success information, the transmitting apparatus may identify the restoration failures of the block #5 and the block #10.

Thereafter, the transmitting apparatus and/or the receiving apparatus may restore bit information from remaining blocks other than a block that fails to restore among the 2b blocks, and generate the secret key using the restored bit information.

For example, the transmitting apparatus and/or the receiving apparatus may generate the secret key based on the information of (2b-a)×k-bit restored from the remaining 2b-a blocks excluding a block that is a restoration failure among 2b blocks. That is, when the transmitting apparatus and the receiving apparatus identifies the restoration failure of a block from the restoration success information of the other party, it may restore (2b-a)×k-bit information from the remaining 2b−a blocks and may generate the secret key based on the information of (2b-a)×k-bit. The transmitting apparatus and the receiving apparatus may generate a seed for generating the secret key based on the information of (2b-a)×k-bit to generate the secret key, and may generate H(seed) as the secret key. Here, H(may be a cryptographic hash function.

$$Sec\_K_A = H(\oplus W_i) i \neq \text{Fail}(i=1, \ldots, 2b)$$

$$Sec\_K_B = H(\oplus W_i) i \neq \text{Fail}(i=1, \ldots, 2b) \quad \text{(Equation 8)}$$

As described above, according to the embodiment, the error information can be effectively and safely removed from the synchronization information including a certain level of errors by using the error correction code, and based on this, the transmitting end and the receiving end that participated in the secret key generation can share the same secret key. In addition, the inefficiency required to increase the level of the synchronization of the neural networks for the key exchange can be eliminated.

Figure 4:
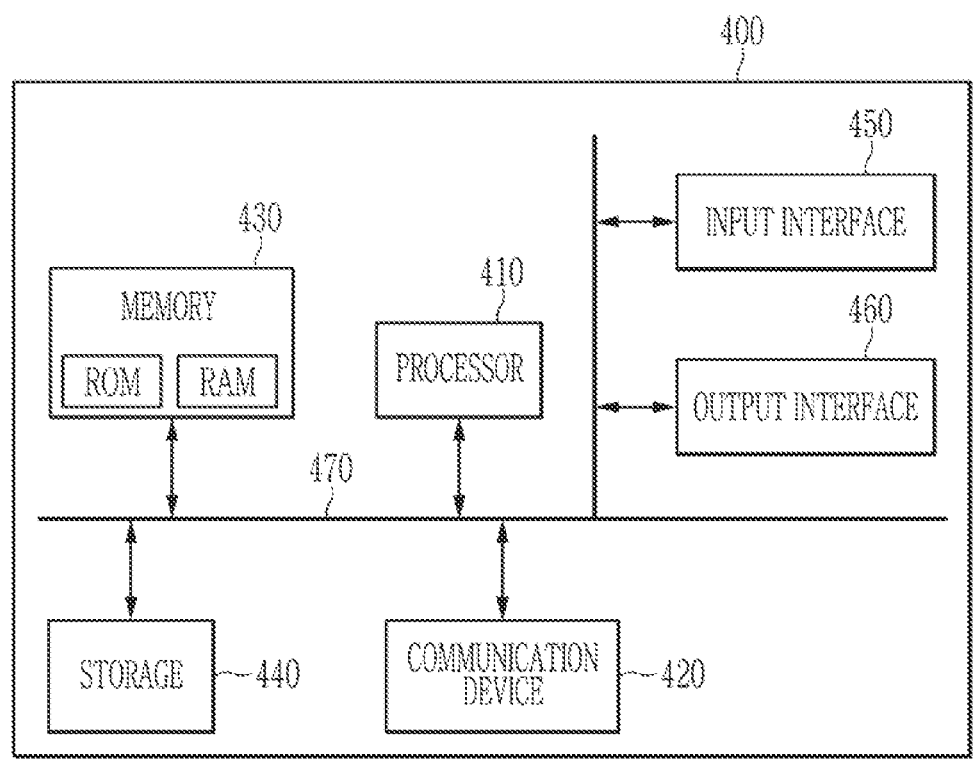
FIG. 4 is a block diagram illustrating an apparatus for generating a secret key according to another embodiment.

FIG. 4 is a block diagram illustrating an apparatus for generating a secret key according to another embodiment.

The apparatus for generating the secret key according to another embodiment may be implemented as a computer system, for example, a computer-readable medium. Referring to FIG. 4, the computer system 400 may include at least one of a processor 410, a memory 430, an input interface device 450, an output interface device 460, and a storage device 440 communicating through a bus 470. The computer system 400 may also include a communication device 420 coupled to the network. The processor 410 may be a central processing unit (CPU) or a semiconductor device that executes instructions stored in the memory 430 or the storage device 440. The memory 430 and the storage device 440 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 420 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any disclosure or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A method for generating a secret key for encrypted communication using a synchronized neural network, the method comprising:
   generating initial codewords based on a bit string of weight values of the synchronized neural network and transmitting a first partial codeword of the initial codewords to a device of another party;
   receiving second partial codewords generated by the device of the other party and generating final codewords by combining the second partial codeword received from the device of the other party with the bit string of the weight values;
   performing an error correction on the final codewords and transmitting first restoration success information according to the error correction to the device of the other party; and
   receiving second restoration success information from the device of the other party and generating the secret key based on the second restoration success information.

2. The method of claim 1,
   wherein the generating initial codewords based on a bit string of weight values of the synchronized neural network and transmitting a first partial codeword of the initial codewords to a device of another party comprises:
   dividing the bit string into a plurality of blocks; and
   generating the initial codewords for a part of the plurality of blocks,
   wherein each of the plurality of blocks has a k-bit length.

3. The method of claim 2,
   wherein when a length of each of the initial codewords is n, a length of the first partial codeword is (n−k)-bit.

4. The method of claim 2,
   wherein the generating the initial codewords for a part of the plurality of blocks comprises
   generating the initial codewords for a half of the plurality of blocks, and
   the combining final codewords based on the second partial codeword received from the device of the other party and the bit string of the weight values comprises
   combining the final codewords based on another half of the bit string corresponding to another half of the plurality of blocks and the second partial codeword of second codewords generated by the device of the other party based on a bit string of weight values updated by the other party.

5. The method of claim 3,
   wherein the receiving a second partial codeword generated by the device of the other party and combining final codewords based on the second partial codeword received from the device of the other party and the bit string of the weight values comprises
   receiving M/(2k) second partial codewords of (n−k)-bit length from the device of the other party when a length of the weight values is M-bit and the M is a multiple of 2.

6. The method of claim 5,
   wherein the receiving a second partial codeword generated by the device of the other party and combining final codewords based on the second partial codeword received from the device of the other party and the bit string of the weight values further comprises determining one of the final codewords by combining the second partial codeword of the (n−k)-bit length and one block corresponding to the weight values of k-bit length.

7. The method of claim 1, wherein the receiving second restoration success information from the device of the other party and generating the secret key based on the second restoration success information comprises:

determining a block for which restoration has failed among the plurality of blocks based on the second restoration success information; and restoring bit information from remaining blocks except for the block for which the restoration has failed among the plurality of blocks.

8. The method of claim 7, wherein the receiving second restoration success information from the device of the other party and generating the secret key based on the restoration success information further comprises:

generating a seed based on the restored bit information and generating the secret key by inputting the seed to a hash function.

9. An apparatus for generating a secret key for encrypted communication using a synchronized neural network, the apparatus comprising:

a processor, a memory, and a communication device, wherein the processor coupled to the communication device executes a program stored in the memory to perform:

generating initial codewords based on a bit string of weight values of the synchronized neural network and transmitting a first partial codeword of the initial codewords to a device of another party through the communication device;

receiving a second partial codeword generated by the device of the other party through the communication device and generating final codewords by combining the second partial codeword received from the device of the other party with a remaining bit string of the weight values which is not used to generate the initial codewords;

performing an error correction on the final codewords and transmitting first restoration success information according to the error correction to the device of the other party through the communication device; and receiving second restoration success information from the device of the other party through the communication device and generating the secret key based on the restoration success information of the device of the other party.

10. The apparatus of claim 9, wherein when generating the initial codewords based on the bit string of the weight values of the synchronized neural network and transmitting the first partial codeword of the initial codewords to the device of the other party through the communication device, the processor performs:

dividing the bit string into a plurality of blocks; and generating the initial codewords for a part of the plurality of blocks, wherein each of the plurality of blocks has a k-bit length.

11. The apparatus of claim 10, wherein when a length of each of the initial codewords is n, a length of the first partial codeword is (n−k)-bit.

12. The apparatus of claim 10, wherein when generating the initial codewords for the part of the plurality of blocks, the processor performs generating the initial codewords for a half of the plurality of blocks, and when combining final codewords based on the second partial codeword received from the device of the other party and the bit string of the weight values, the processor performs combining the final codewords based on another half of the bit string corresponding to another half of the plurality of blocks and the second partial codeword of second codewords generated by the device of the other party based on a bit string of weight values updated by the other party.

13. The apparatus of claim 11, wherein when receiving the second partial codeword generated by the device of the other party through the communication device and combining the final codewords based on the second partial codeword received from the device of the other party and the remaining bit string of the weight values which is not used to generate the initial codewords, the processor performs receiving M/(2k) second partial codewords of (n−k)-bit length from the device of the other party through the communication device when a length of the weight values is M-bit and the M is a multiple of 2.

14. The apparatus of claim 13, wherein when receiving the second partial codeword generated by the device of the other party through the communication device and combining the final codewords based on the second partial codeword received from the device of the other party and the remaining bit string of the weight values which is not used to generate the initial codewords, the processor executes the program to further perform determining one of the final codewords by combining the second partial codeword of the (n−k)-bit length and one block corresponding to the weight values of k-bit length.

15. The apparatus of claim 9, wherein when receiving the second restoration success information from the device of the other party through the communication device and generating the secret key based on the restoration success information of the device of the other party, the processor performs:

determining a block for which restoration has failed among the plurality of blocks based on the second restoration success information; and restoring bit information from remaining blocks except for the block for which the restoration has failed among the plurality of blocks.

16. The apparatus of claim 15, wherein when receiving the second restoration success information from the device of the other party through the communication device and generating the secret key based on the restoration success information of the device of the other party, the processor executes the program to further perform generating a seed based on the restored bit information and generating the secret key by inputting the seed to a hash function.

17. An apparatus for generating a secret key for encrypted communication using a synchronized neural network, the apparatus comprising:

a processor, a memory, and a communication device, wherein the processor executes a program stored in the memory to perform:

generating initial codewords based on a bit string corresponding to weight values of the synchronized neural network;

receiving restoration success information according to an error correction from a device of another party through the communication device after the error correction of final codewords, wherein the device of the other party combines a partial codeword with a part of the initial codewords; and generating the secret key based on the restoration success information.

* * * * *